United States Patent
Freienstein et al.

(10) Patent No.: US 9,365,139 B2
(45) Date of Patent: Jun. 14, 2016

(54) METHOD AND DEVICE FOR PROTECTING AND RESTRAINING A PASSENGER AND AN EVALUATION AND CONTROL UNIT FOR A PROTECTION AND RESTRAINT DEVICE

(75) Inventors: Heiko Freienstein, Weil der Stadt (DE); Armin Koehler, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 229 days.

(21) Appl. No.: 13/637,509

(22) PCT Filed: Mar. 15, 2011

(86) PCT No.: PCT/EP2011/053874
§ 371 (c)(1),
(2), (4) Date: Sep. 26, 2012

(87) PCT Pub. No.: WO2011/117110
PCT Pub. Date: Sep. 29, 2011

(65) Prior Publication Data
US 2013/0026802 A1 Jan. 31, 2013

(30) Foreign Application Priority Data
Mar. 26, 2010 (DE) .......................... 10 2010 003 315

(51) Int. Cl.
*B60N 2/427* (2006.01)
*B60R 21/02* (2006.01)
(Continued)

(52) U.S. Cl.
CPC .............. *B60N 2/449* (2013.01); *B60N 2/0276* (2013.01); *B60N 2/4235* (2013.01); *B60N 2/4279* (2013.01); *B60N 2/42727* (2013.01); *B60R 21/015* (2013.01); *B60R 21/0134* (2013.01)

(58) Field of Classification Search
CPC ................................. B60R 21/013; B60N 2/06
USPC ......... 701/45, 46; 297/216.1; 280/729, 730.1, 280/730.2
See application file for complete search history.

(56) References Cited

U.S. PATENT DOCUMENTS 5,857,701 A * 1/1999 Nanda ..................... B60R 21/08
280/749
6,209,908 B1 * 4/2001 Zumpano ............... B60N 2/286
280/729

(Continued)

FOREIGN PATENT DOCUMENTS

CN 1701010 11/2005
DE 102008001506 11/2009

(Continued)

OTHER PUBLICATIONS
International Search Report for PCT/EP2011/053874, dated Aug. 8, 2011.

*Primary Examiner* — Thomas G Black
*Assistant Examiner* — Wae Louie
(74) *Attorney, Agent, or Firm* — Norton Rose Fulbright US LLP

(57) ABSTRACT

A method for protecting and restraining a passenger on a passenger seat of a vehicle in case of an accident, with the aid of at least one restraint element of a protection and restraint device, an evaluation and control unit for a protection and restraint device for carrying out the method, a protection and restraint device for protecting a passenger having such an evaluation and control unit, as well as a corresponding computer program and computer program product for carrying out the method are described. A positioning applied force is generated as a function of an ascertained current driving situation, the applied force accelerating the passenger away from a vehicle side structure in the direction of the middle of the vehicle if a predefined precrash situation is detected.

11 Claims, 3 Drawing Sheets

(51) Int. Cl.
*B60N 2/44* (2006.01)
*B60N 2/02* (2006.01)
*B60N 2/42* (2006.01)
*B60R 21/0134* (2006.01)
*B60R 21/015* (2006.01)

(56) References Cited

U.S. PATENT DOCUMENTS

| | | | | |
|---|---|---|---|---|
| 6,896,325 B2* | 5/2005 | Takedomi | | B60R 21/207 280/730.1 |
| 7,144,032 B2* | 12/2006 | Lunt | | B60R 21/21 280/728.2 |
| 7,400,958 B2* | 7/2008 | Lich | | B60R 21/013 701/45 |
| 7,484,756 B2* | 2/2009 | Le | | B60R 21/0132 180/274 |
| 7,635,043 B2* | 12/2009 | Breed | | B60J 10/00 180/282 |
| 8,244,437 B2* | 8/2012 | Le | | B60R 21/0134 280/735 |
| 2001/0017477 A1* | 8/2001 | Rajasingham | | A61G 5/04 296/187.12 |
| 2003/0076981 A1* | 4/2003 | Smith | | B60R 21/013 382/104 |
| 2003/0127837 A1* | 7/2003 | Rajasingham | | B60N 2/06 280/730.1 |
| 2004/0124615 A1* | 7/2004 | Tanase | | B60R 21/207 280/730.2 |
| 2005/0127645 A1 | 6/2005 | Smith et al. | | |
| 2010/0078917 A1* | 4/2010 | Oigawa | | B60R 21/0136 280/728.1 |
| 2011/0202241 A1* | 8/2011 | Le | | B60R 21/0134 701/46 |
| 2012/0007408 A1* | 1/2012 | Freienstein | | B60N 2/0276 297/464 |
| 2012/0123645 A1* | 5/2012 | Kwon | | B60N 2/4235 701/46 |
| 2013/0026802 A1* | 1/2013 | Freienstein | | B60N 2/0276 297/216.1 |

FOREIGN PATENT DOCUMENTS

| | | |
|---|---|---|
| JP | 2003-312341 | 11/2003 |
| JP | 2006-88798 | 4/2006 |
| WO | WO 2004/103779 | 12/2004 |

\* cited by examiner

METHOD AND DEVICE FOR PROTECTING AND RESTRAINING A PASSENGER AND AN EVALUATION AND CONTROL UNIT FOR A PROTECTION AND RESTRAINT DEVICE

CROSS REFERENCE TO RELATED APPLICATIONS

The present application is the national stage entry of International Patent Application No. PCT/EP2011/053874, filed on Mar. 15, 2011, which claims priority to Application No. DE 10 2010 003 315.4, filed in the Federal Republic of Germany on Mar. 26, 2010.

FIELD OF INVENTION

The present invention relates to a method for restraining a vehicle passenger on a vehicle seat, an evaluation and control unit for a protection and restraint device, a protection and restraint device for the protection of a passenger in a vehicle seat, as well as a computer program and a computer program product.

BACKGROUND INFORMATION

In case of a side impact, today's side structures of vehicles permit considerable penetration of parts of the side structure into the interior of the vehicle. The passenger of the vehicle is able to be protected from this by a side airbag. In a usual vehicle, the passenger cell is designed, in addition, in as stable a manner as possible for the side impact. This has the result that only a very limited space is available for dissipating the energy of the side impact.

In order to ensure as great as possible a protection for the passengers in case of a crash, air bags are often used in the related art as frontal air bags, side air bags or head air bags. These air bags, however, function optimally only if the vehicle passenger is located in a predetermined position, and is not removed from this position by the forces occurring during, and directly before the accident. In order to restrain the passenger in this position, a seat belt is frequently used, which is supposed to restrain the vehicle passenger in the appropriate, predetermined position. One should note, however, in this context, that this seat belt, which is mostly designed as a 3-point seat belt, covers a large area of the upper body and thus fixes it, but in the case of a side impact, or in the case of an extreme passenger sitting pose, the effectiveness of the belt is limited. Thus, during an accident, the vehicle passenger may slide sideways from the vehicle seat, for example, or to the front all the way through the seat belt, so that, shortly after an accident, the vehicle passenger is no longer located in the optimal field of effectiveness of the air bag or bags.

In order to prevent such a lateral sliding away, International Patent Publication No. WO 2004/103779 A1 proposes an active seat which is actuated as a function of a sensor system which, for instance, monitors the surroundings of the vehicle. If, for example, an approaching vehicle or a collision of an object with the host vehicle is detected, a lateral support installed in the seat may be set up or advanced reversibly electrically, pneumatically or by a spring-actuated mechanism, so as to position the passenger appropriately.

SUMMARY

The method according to the present invention for protecting and restraining a passenger on the passenger seat of a vehicle during an accident, with the aid of at least one restraint element of a protecting and restraint device, has an advantage that, as a function of an ascertained current driving situation, a positioning applied force is produced which accelerates the passenger away from a vehicle side structure in the direction of the middle of the vehicle, if a specified precrash situation is detected. Such a dangerous precrash situation is detected, for example, if the driver, based on a short time span ascertained, up to an impending side impact, or the travel physics, no longer has the possibility of making an intervention. The short time span may be specified, for example, by a threshold value adjusted to the vehicle and a passenger protection system. This means that the specified precrash situation is detected, for instance, when a remaining time duration ascertained, up to an impending side impact, falls below the specified threshold value.

The evaluation and control unit according to the present invention, for a protection and restraint device for protecting a passenger on a passenger seat of the vehicle during a crash, has an advantage that the evaluation and control unit generates a positioning applied force as a function of a current driving situation, and outputs it via at least one interface to the protection and restraint device, in order to accelerate the passenger away from a vehicle side structure in the direction of the middle of the vehicle, when the evaluation and control unit has detected a specified precrash situation. In addition, the evaluation and control unit is connected, via at least one interface, to at least one sensor unit in order to ascertain the current driving situation and the currently acting accelerations, as a function of physical quantities which are recorded by the at least one sensor unit.

The evaluation and control unit according to the present invention is developed to carry out steps of the abovementioned method and of a computer program for controlling steps of the abovementioned method, if the computer program is run on the evaluation and control unit. By an evaluation and control unit one may understand, in this case, an electrical device such as a control unit, which processes sensor signals and outputs control signals as a function thereof. The control unit may have at least one interface, which may be developed as hardware and/or software. In a hardware design, the interfaces may, for example, be part of a so-called system ASIC, which includes the most varied functions of the control unit. However, it is also possible for the interfaces to be separate, integrated switching circuits or to be at least partially made up of discrete components. In a software design, the interfaces may be software modules which are present on a microcontroller in addition to other software modules, for example. An advantageous development also includes a computer program product having program code that is stored on a machine-readable medium such as a semiconductor memory, a hard-disk memory or an optical memory, which is used to implement the method according to one of the specific embodiments described above, when the program is executed on a control unit.

The evaluation and control unit according to the present invention may be used, for example, in a protection and restraint device for protecting a passenger on a passenger seat of a vehicle during an accident, which has at least one adjustable restraint element, which effects a lateral support of the passenger as a function of accelerations in the direction of a transverse vehicle axis. In this instance, the at least one restraint element may be integrated into the passenger seat, and when necessary, depending on the requirement, may be moved out of the passenger seat or moved back into the passenger seat again. The positioning applied force generated by the evaluation and control unit acts on the passenger via an adjustable restraint element situated between the passenger and the vehicle's side structure.

Specific embodiments of the present invention have the effect that, in response to a detected, impending side impact, a passenger is moved in the direction of the middle of the vehicle, so as, in an advantageous manner, to enlarge the lateral survival space, and to protect the passenger from penetrating parts of the side structure. In addition, because of the enlargement of the lateral survival space, an inflating process of a side air bag, that is present, is able to be optimized. Furthermore, the relative speed of the passenger drops off when impacting the side structure. This is caused by the additive superposition of the positioning applied force away from the side structure and of the crash applied force in the direction towards the side structure.

It is particularly advantageous that the positioning applied force is generated in correct phase relation, as a function of the ascertained lateral acceleration, when forces acting against the positioning applied force fall below a specified threshold value. In correct phase relation means that the passenger is accelerated in the direction of the middle of the vehicle when no forces are prevailing, or when forces prevail which would not appreciably restrain the acceleration in the direction towards the middle of the vehicle. Thereby, in an advantageous manner, the effectiveness of the generated positioning applied forces may be improved, and wasted energy may be avoided, since the positioning applied forces do not have to act counter to a lateral acceleration of the passenger that results from a driving maneuver. This advantageously prevents the generated positioning applied forces from being neutralized.

In an advantageous embodiment of the method according to the present invention, the positioning applied force is transferred to the passenger via a restraint element, that is situated between the passenger and the side structure of the vehicle, the at least one restraint element in the vehicle is moved, as a function of the ascertained current driving situation, in such a way that the passenger, as a function of accelerations, experiences a lateral support in the direction of a transverse vehicle axis, and before the transfer of the positioning applied force by the at least one restraint element, a mechanical force of restraint is exerted on the passenger, which presses against the at least one restraint element.

In an advantageous embodiment of the present invention, the evaluation and control unit generates the positioning applied force as a function of an ascertained lateral acceleration, in correct phase relation, when forces acting counter to the positioning applied force fall below a specified threshold value, the evaluation and control unit ascertaining the acting forces by evaluating the ascertained physical quantities.

In a further advantageous embodiment of the present invention, the evaluation and control unit has the effect, as a function of the ascertained accelerations in the direction of a transverse vehicle axis, of providing a lateral support of the passenger via appropriate control signals to the at least one protection and restraint device.

In an advantageous embodiment of the protection and restraint device according to the present invention, the at least one restraint element is adjustable by the actuation of at least one drive device. The at least one drive device may be designed, for instance, as an electrical, mechanical, pyrotechnical, pneumatic and/or hydraulic unit.

The drive unit may be developed in such a way that the restraint element is brought into the target position in a motion having a curved trajectory, particularly in a sickle-shaped motion. Such a specific embodiment of the present invention offers the advantage that a possible motion of the passenger is able to be gently intercepted, and the passenger does not impact upon an object that is suddenly located in his path of motion. Furthermore, the drive unit may be designed so that the restraint element moves away from the passenger seat in a first motion, and in a second motion is moved again towards the passenger seat, after the second motion, at least a part of the restraint element being located in the target position, in order to restrain the passenger in the predetermined position. Such a specific embodiment of the present invention also makes possible the gentle intercepting of the passenger, the restraint element being first moved from a lateral support of the backrest of the vehicle seat in the direction of a vehicle door slantwise forward, and subsequently being folded rearward in the direction of the thorax of the vehicle passenger. The drive unit is developed so that the restraint element is able to be brought into the target position in time, in order to pass on the generated positioning applied force to the passenger, and thus to achieve its optimal protective effect. This is achieved, for example, in connection with a suitable sensor system, such as an inertial sensor system or a predictive sensor system, via which, even before contact with the accident partner, the drive unit is able to be actuated and activated.

In order to enable an early activation of the restraining device, which in the case of a possible faulty triggering causes no unnecessary costs, the drive unit may also be developed so that the restraint element is returned from the target position back into the initial position. Such a specific embodiment offers the advantage that, because of the early moving out of the restraint element at a time of accident, good protection of a passenger is already in force, and the additional safety devices are able to act optimally. In this case, the triggering time for the irreversible restraint element may be selected further along, so that because of this longer time span, a safer detection of an actually occurring accident is possible. For, if the irreversible restraint element is triggered too early and unnecessarily, higher costs for the repair of the vehicle will clearly be created.

In a further advantageous refinement of the protection and restraint device of the present invention, the at least one restraint element is designed so that it transfers the positioning applied force to the area of the thorax (upper body) of the passenger. This starting point enables in an advantageous manner an optimal lever, and the biomechanics of the human body allows a positioning intervention to be made in this case.

Exemplary embodiments of the present invention are illustrated in the drawings and elucidated in greater detail in the following description.

DETAILED DESCRIPTION

The specific embodiments of the present invention are intended to provide a protective effect for a passenger in the case of an accident, and in addition, support and improve the protective effect of other systems. Especially in the case of a side impact, specific embodiments of the present invention are intended to contribute to keeping away the passenger from the side structure, and to enlarging the survival space that is provided, conditioned upon the construction of the vehicle, so that all restraining and safety systems are able to develop their effect in optimal fashion.

Figure 1:
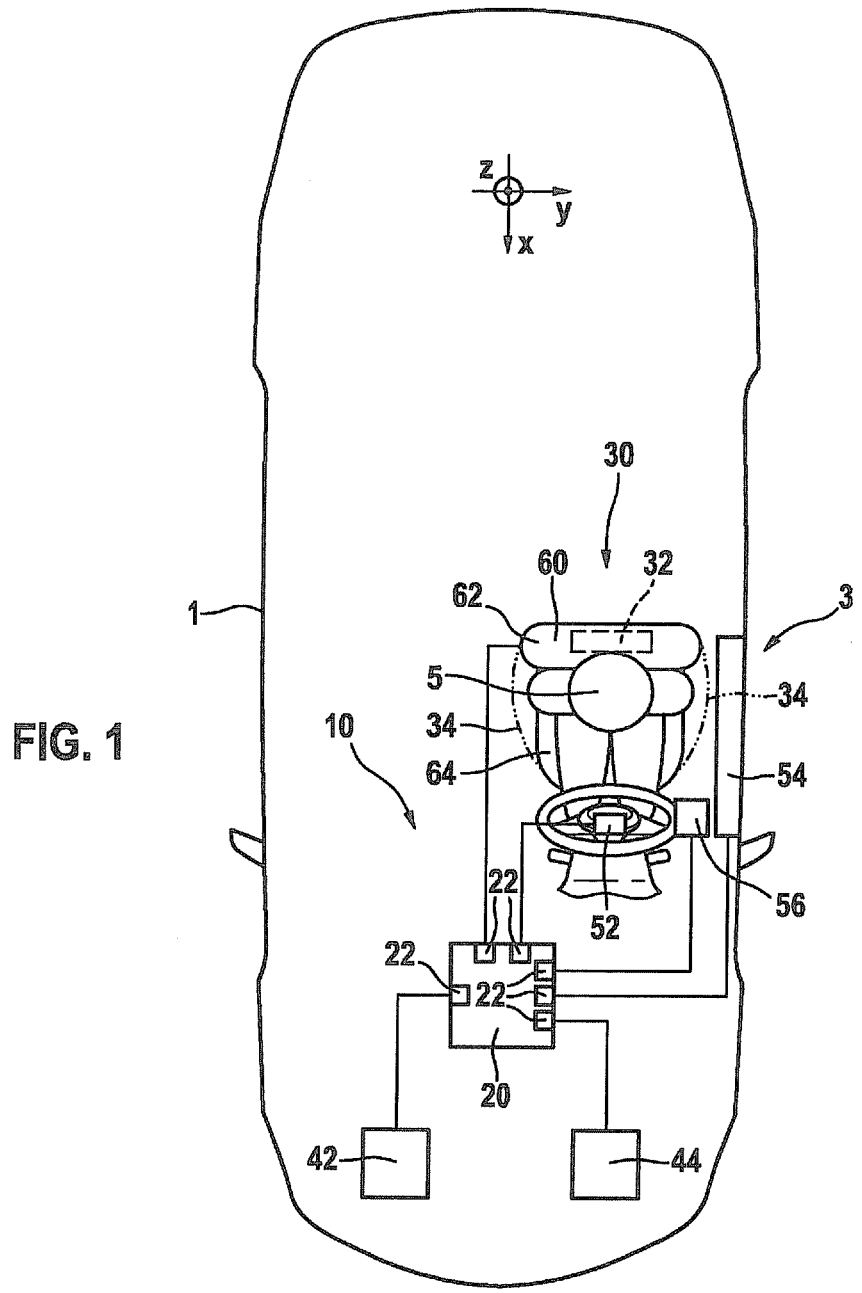
FIG. 1 shows a schematic top view of a motor vehicle using an exemplary embodiment of a protection and restraint device of a passenger protection system according to the present invention.

For the clear representation of the present invention, FIG. 1, in collaboration with additional components, shows a passenger protection system 10 of a vehicle 1, which includes protection and restraint device 30 for the protection of a passenger 5, according to an exemplary embodiment of the present invention. Passenger protection system 10 includes a plurality of sensor units 42, 44, for example, which are designed, for instance as surroundings sensor system 42 for recording a surroundings situation which may include, for example, radar sensors, cameras, ultrasonic sensors, etc., for recording the approach of a non-host vehicle, and/or as crash sensor system 44 for recording a jolt during an impact of the non-host vehicle on host vehicle 1, which includes, for instance, acceleration sensors, capacitive sensors, up-front sensors, pressure sensors, etc. Sensor units 42, 44 record appropriate physical quantities, and provide signals representing these via at least one interface 22 to an evaluation and control unit 20. In the exemplary embodiment shown, the various sensors are combined in a crash sensor system block 44, the individual sensors being able to be situated at various places in the vehicle. Sensors for recording a side crash are typically situated in the B column, or close to the center of gravity of the vehicle. Evaluation and control unit 20 evaluates the signals received and produces appropriate control signals for safety devices of passenger protection system 10. As safety devices, for example, depending on the requirements of the situation, a front air bag 52 in a steering wheel and/or from the instrument console of vehicle 1, a side air bag 54 in a door and/or a passenger seat 60 of vehicle 1, and/or a head air bag 56 in a roof pillar of vehicle 1 may be triggered, in order to prevent an impact of vehicle passenger 5 on corresponding structural elements of vehicle 1. In addition, protection and restraint device 30 prevents the sliding away of vehicle passenger 5 from vehicle seat 60. For this, protection and restraint device 30 includes at least one restraint element 34, which is moved out by a drive 32 laterally to vehicle seat 60, and restrains vehicle passenger 5 in an optimal position for air bags 52, 54, 56, so that vehicle passenger 5 falls as centrally and as optimally aligned as possible into the correspondingly inflated air bags 52, 54, 56 and lateral sliding away from corresponding air bags 52, 54, 56 is able to be avoided. Restraint element 34 may be implemented, for example, in the form of a vehicle seat side bolster in backrest 62, as may be seen in FIG. 2, and/or of seat area 64, which is moved out before the actual impact of a non-host vehicle onto host vehicle 1, so that the lateral side restraint of passenger 5 is improved.

Figure 2:
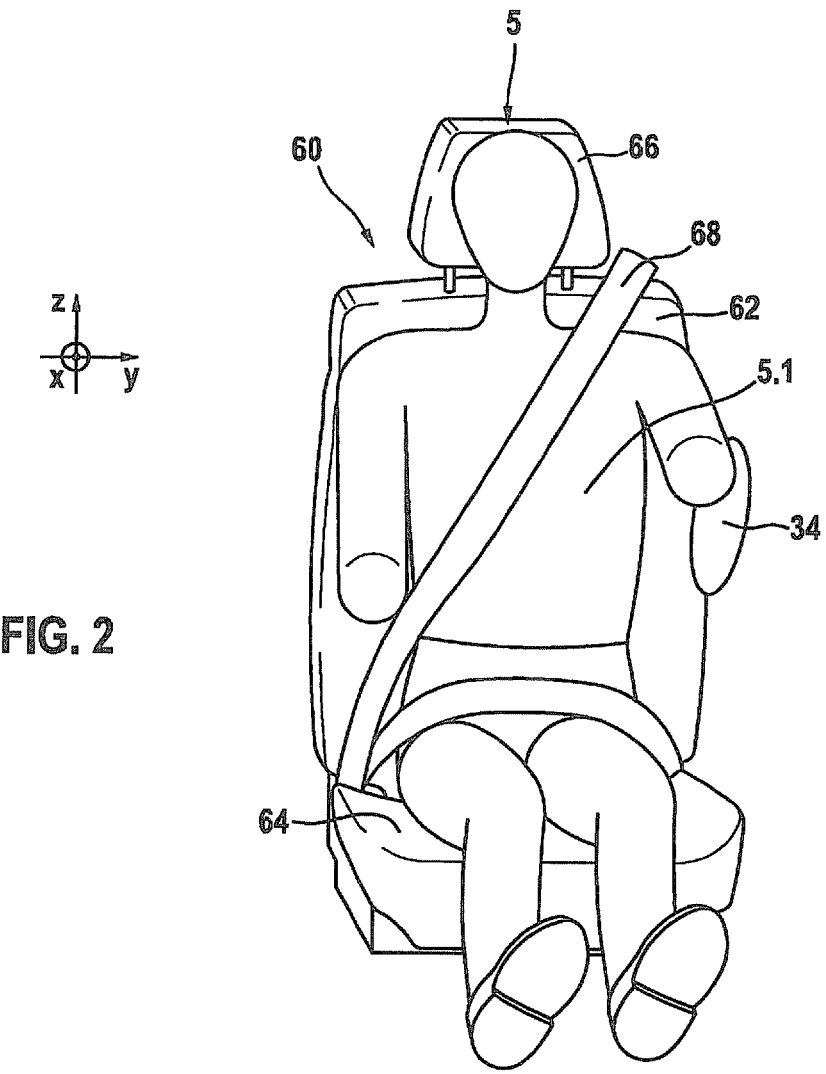
FIG. 2 shows a schematic perspective representation of a passenger on a passenger seat having the integrated protection and restraint device of FIG. 1, according to the present invention.
Figure 3:
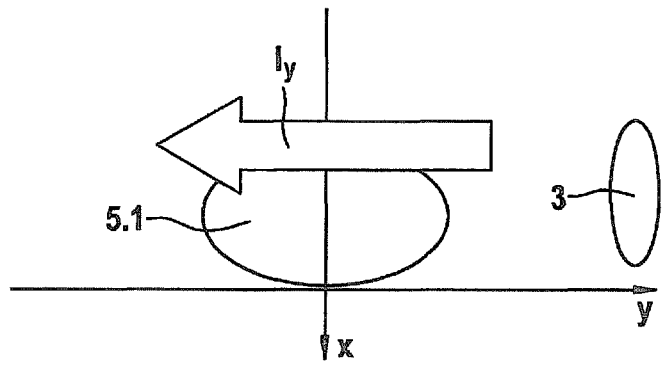
FIG. 3 shows a schematic representation of a positioning applied force.

As may further be seen in FIGS. 2 and 3, adjustable restraint element may, as a function of accelerations in the direction of a transverse vehicle axis y, effect a lateral support of passenger 5. For this, restraint element 34 is moved out of passenger seat 60 if necessary, depending on the requirements, or moved into passenger seat 60 again.

According to the present invention, evaluation and control unit 20, as a function of the current driving situation, generates a positioning applied force $I_y$ and emits this via at least one interface 22 to protection and restraint device 30, in order to accelerate passenger 5 away from a vehicle side structure 3 in the direction of the middle of the vehicle, if evaluation and control unit 20 has detected a specified precrash situation. Evaluation and control unit 20 detects the specified precrash situation, for instance, when an ascertained remaining time duration, up to an impending side impact, falls below a specified threshold value. Positioning applied force $I_y$ emitted to protection and restraint device 30 is passed on to passenger 5 via drive 32 and an adjustable restraint element 34 that is situated between passenger 5 and vehicle side structure 3, so that passenger 5 is moved away from vehicle side structure 3 in the direction towards the middle of the vehicle. The at least one restraint element 34 is preferably designed so that it passes on positioning applied force $I_y$ in the area of the thorax 5.1 to passenger 5. This starting point enables in an advantageous manner an optimal lever, and the biomechanics of the human body allows a positioning intervention to be made in this case in order to move passenger 5 in the direction towards the middle of the vehicle.

Evaluation and control unit 20 ascertains, as a function of physical quantities, which are recorded by the at least one sensor unit 42, 44, a current driving situation and currently acting accelerations $a_y$, evaluation and control unit 20, as a function of ascertained accelerations $a_y$, effecting the lateral support of passenger 5 in the direction of transverse vehicle axis y via appropriate control signals to protection and restraint device 30. To improve the effectiveness, evaluation and control unit 20 generates the positioning applied force $I_y$ as a function of the ascertained lateral acceleration $a_y$, in correct phase relation, when forces acting counter to the positioning applied force $I_y$ fall below a specified threshold value, evaluation and control unit 20 ascertaining the acting forces by evaluating the ascertained physical quantities. A possible reaction pattern is shown in exemplary fashion in FIG. 4.

Figure 4:
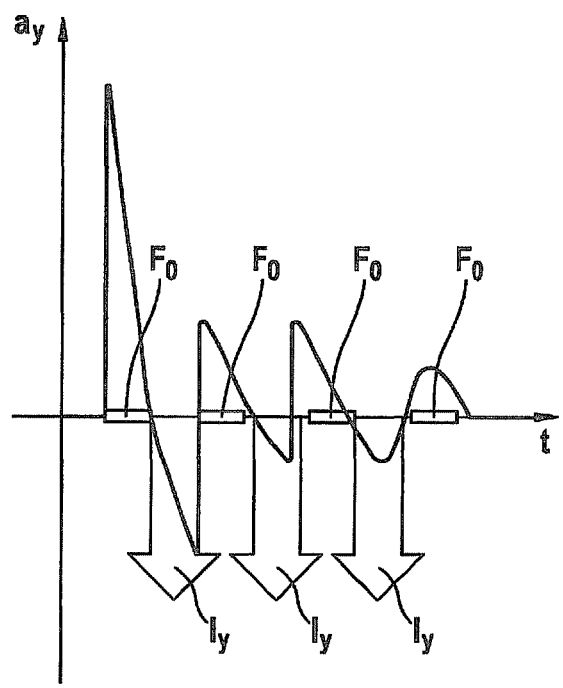
FIG. 4 shows a schematic acceleration diagram having a possible reaction pattern of the protection and restraint device of FIGS. 1 through 3.

As may further be seen in FIG. 4, evaluation and control unit 20 generates no positioning applied forces $I_y$, when, for instance, based on a driving maneuver, a positive lateral acceleration $a_y$ of vehicle 1 is ascertained, i.e. passenger 5 is moved in the direction of vehicle side structure 3. In order to counteract this motion, during these time intervals, evaluation and control unit 20 provides a predefined restraining force $F_0$ via drive 32 and restraint element 34, in order to restrain passenger 5 in position. As may further be seen in FIG. 4, evaluation and control unit 20 generates no positioning applied forces $I_y$, when, for instance, based on a driving maneuver, a positive lateral acceleration $a_y$ of vehicle 1 is ascertained, i.e. passenger 5 is moved in the direction of vehicle side structure 3.

The protection and restraint device 30, which is also designated as ESA (enveloping side adjustment), makes possible, especially in conjunction with already present restraint systems, an improved effectiveness of these restraint systems. As restraint elements of passenger protection system 10 the following are provided: passenger seat 60, having backrest 62, seat surface 64, headrest 66, a seat belt 68, front air bag 52, side air bag 54 and head air bag 56, as well as protection and restraint device 30. The effect of protection and restraint device 30 is supported by seat belt 68, and very greatly restrains a lateral passenger motion towards the impact side of the non-host vehicle, and seat belt 68 also restrains in a certain way the lateral passenger motion, but not as strongly as protection and restraint device 30. Such a lateral passenger motion would clearly diminish a survival zone in size, so that the effective action of side airbags 54, particularly its effective volume, is restricted, whereas a large air bag would enlarge the survival zone. A large survival zone and also a large air bag volume do, however, reduce the severity of injury. The introduction of protection and restraint device 30 having positioning applied force $I_y$ according to the present invention, thus leads to an improved protective effect by the remaining restraint elements, via the restraint of the lateral passenger motion in the direction of the middle of the vehicle. In addition, there is the lowered impact speed of the passenger onto the side structure.

In comfort operation, a drive 32 of restraint element 34 of protection and restraint device 30 is able to be adapted by passenger 5 manually, or even in automated form or partially automated form to the requirements of comfortable driving. As an example, one might mention a driving dynamics lateral restraint or an active backrest width adjustment for known vehicles of the higher class, which may also be used for vehicle seats having the restraint device. In the case of a precrash detection, that is, a detection of a directly impending accident, before the accident has taken place, the lateral supports are moved out as restraint element 34 of protection and restraint device 30 of passenger seat 60 in such a way that passenger 5 is not pushed out of the seat, but rather experiences additional lateral support. The method takes place in one or in a plurality of phases. Thus, the restraint element 34 integrated into passenger seat 60 may be shifted in common or singly, depending on the danger situation, by drive 32 and moved, in order to support passenger 5 laterally. In an additional phase, positioning applied force $I_y$ is then generated at suitable times, in order to move passenger 5 in the direction of the middle of the vehicle. Drive 32 may be an electric motor or a pneumatic unit, which is able to move and adjust restraint element 34 in various directions. As the actuators of drive 32, basically all suitable machine elements are conceivable, singly or in combination, such as an electric motor having a gear rack/cam disc, a pneumatic cylinder and/or bellows, spring elements having an electromagnetic or other triggering mechanism.

Specific embodiments of the present invention may be implemented as a circuit, a device, a method, a data processing program having program code and/or as a computer program product. The present invention may correspondingly be executed completely as hardware, as software and/or as a combination of hardware and/or software components. In addition, the present invention may be executed as a computer-program product on a computer-usable storage medium having computer-readable program code, various computer-readable storage media, such as hard disks, CD-ROM's, optical or magnetic storage elements, etc., being able to be used.

The computer-usable or computer-readable media may include, for instance, electronic, magnetic, optical, electro-magnetic infrared systems or semiconductor systems, apparatuses, devices or propagation media. In addition, the computer-readable media may include an electrical connection to one or more lines, a portable computer disk, a memory having direct access (RAM), an erasable and programmable read-only memory (EPROM) or a flash memory, an optical line and a portable CD-ROM. The computer-usable or the computer-readable medium may even be paper or another suitable medium, on which the program is written, and from which it is electrically recordable, for instance, by an optical scanning process of the paper or electrically of the other medium, then compiled, interpreted or processed, if necessary, in another way and then stored in the computer memory.

Specific embodiments of the present invention advantageously provide an efficient electric motor system, which is able to generate a positioning applied force that acts on the thorax (the upper body) of the passenger. Specific embodiments of the present invention may be regarded as extensions of the ESA system. The simplest direct implementation is an activation of the positioning applied force as a function of the vehicle situation. If there exists a dangerous precrash situation, in which the driver has no possibility of intervention, because of the small time span until the impending side impact or the driving physics, the positioning applied force is activated and accelerates the passenger in the direction of the middle of the vehicle. This functionality may advantageously be broadened by the lateral acceleration of the vehicle being recorded and evaluated, in order to confer a positioning applied force which gives the passenger as high a speed as possible away from the side structure in the direction of the middle of the vehicle. For this reason, the positioning applied force is generated "in correct phase relation", and the thorax of the passenger is accelerated by the restraint element 34 when no forces prevail which significantly inhibit this acceleration in the direction of the middle of the vehicle.

What is claimed is:

1. A method for protecting and restraining a passenger on a passenger seat of a vehicle, the method comprising:
in response to detection of an impending accident:
generating, by a restraint device, a positioning applied force that accelerates the passenger away from a vehicle side structure in a direction toward a middle of the vehicle if the detection of the impending accident includes detection of a specified precrash situation; and
subsequent to the application of the force, triggering a side air bag.

2. The method according to claim 1, wherein the specified precrash situation is detected when an ascertained time duration remaining up to an impending side impact falls below a specified threshold value.

3. A method for protecting and restraining a passenger on a passenger seat of a vehicle in case of an accident, with aid of at least one restraint element of a protection and restraint device, comprising:
generating a positioning applied force as a function of an ascertained current driving situation, the applied force accelerating the passenger away from a vehicle side structure in a direction toward a middle of the vehicle if a specified precrash situation is detected;
wherein the positioning applied force is generated in correct phase relation, as a function of an ascertained lateral acceleration, based on satisfaction of a condition that forces acting counter to the positioning applied force fall below a specified threshold value.

4. A method for protecting and restraining a passenger on a passenger seat of a vehicle in case of an accident, with aid of at least one restraint element of a protection and restraint device, the method comprising:
generating a positioning applied force as a function of an ascertained current driving situation, the applied force accelerating the passenger away from a vehicle side structure in a direction toward a middle of the vehicle if a specified precrash situation is detected; and
subsequent to the application of the force, triggering a side air bag;
wherein the positioning applied force is transferred to the passenger via the at least one restraint element that is situated between the passenger and the vehicle side structure of the vehicle, the at least one restraint element in the vehicle being moved, as a function of the ascertained current driving situation, such that the passenger, as a function of accelerations, experiences a lateral support in a direction of a transverse vehicle axis before transfer of the positioning applied force by the at least one restraint element, a mechanical force of restraint being exerted on the passenger, which presses against the at least one restraint element.

5. A passenger safety arrangement comprising:
an evaluation and control unit; and
a protection and restraint device for protecting and restraining a passenger wherein:
the evaluation and control unit includes:
at least one interface via which the evaluation and control unit is connected to at least one adjustable restraint element of the protection and restraint device and to at least one sensor unit; and
a computer processor configured to:
ascertain a current driving situation and currently acting accelerations, as a function of physical quantities, which are able to be recorded by the at least one sensor unit;
as a function of detecting, in the current driving situation ascertainment, a specified precrash situation, determine a positioning force to be applied by the at least one adjustable restraint element; and
emit, via the at least one interface and to the protection and restraint device, a signal indicating the positioning force to be applied;
the protection and restraint device is configured to respond to the signal by applying the positioning force, thereby accelerating the passenger away from a vehicle side structure in the direction of the middle of the vehicle; and
the passenger safety arrangement is configured to trigger deployment of a side air bag subsequent to the application of the positioning force.

6. The passenger safety arrangement according to claim 5, wherein the evaluation and control unit determines the positioning applied force as a function of an ascertained lateral acceleration, in correct phase relation, when forces acting counter to the positioning force fall below a specified threshold value, the evaluation and control unit ascertaining the acting forces by evaluating the recorded physical quantities.

7. The passenger safety arrangement according to claim 5, wherein the evaluation and control unit effects a lateral support of the passenger, as a function of ascertained accelerations in a direction of a transverse vehicle axis via corresponding control signals to the at least one protection and restraint device.

8. A protection and restraint device for protection of a passenger on a passenger seat of a vehicle in case of an accident, comprising:

a sensor arrangement;
a control unit communicatively coupled to the sensor arrangement for detecting a predetermined precrash situation based on signals from the sensor arrangement; and
at least one adjustable restraint element, situated between the passenger and a vehicle side structure, communicatively coupled to the control unit, and which effects a lateral support of the passenger as a function of accelerations in a direction of a transverse vehicle axis, the at least one restraint element being integrated into the passenger seat and being configured to be automatically moved into and out of the passenger seat, wherein a positioning applied force acts on the passenger via the at least one adjustable restraint element to accelerate the passenger away from the vehicle side structure responsive to the detection of the predetermined precrash situation.

9. The protection and restraint device according to claim 8, wherein the at least one restraint element is adjustable by actuating at least one drive device, the at least one drive device being at least one of an electrical, mechanical, pyrotechnical, pneumatic and hydraulic unit.

10. The protection and restraint device according to claim 8, wherein the at least one restraint element passes on the positioning applied force to an area of a thorax of the passenger.

11. A non-transitory computer-readable medium on which is stored program code that is executable by a processor, the program code which, when executed by the processor, causing the processor to perform a method for protecting and restraining a passenger on a passenger seat of a vehicle, with aid of a restraint element, the method comprising:
obtaining sensor signals from a sensor arrangement;
based on the sensor signals, detecting an impending accident; and
in response to the detection of the impending accident:
triggering the restraint element to apply a positioning force that accelerates the passenger away from a vehicle side structure in a direction toward a middle of the vehicle if the detection of the impending accident includes detection of a predetermined precrash situation; and
subsequently trigger deployment of a side air bag.

* * * * *